(12) United States Patent
Gormish et al.

(10) Patent No.: US 8,732,570 B2
(45) Date of Patent: May 20, 2014

(54) NON-SYMBOLIC DATA SYSTEM FOR THE AUTOMATED COMPLETION OF FORMS

(75) Inventors: Michael J. Gormish, Redwood City, CA (US); Michael G. E. Griffin, Redwood City, CA (US); Max E. McFarland, Sunnyvale, CA (US)

(73) Assignee: Ricoh Co. Ltd., Tokyo (JP)

( * ) Notice: Subject to any disclaimer, the term of this patent is extended or adjusted under 35 U.S.C. 154(b) by 825 days.

(21) Appl. No.: 11/608,796

(22) Filed: Dec. 8, 2006

(65) Prior Publication Data

US 2007/0089049 A1    Apr. 19, 2007

Related U.S. Application Data

(63) Continuation-in-part of application No. 11/223,768, filed on Sep. 8, 2005.

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| H04N 1/46 | (2006.01) |

(52) U.S. Cl.
USPC ........... 715/226; 715/222; 715/223; 715/224; 715/225; 358/505

(58) Field of Classification Search
CPC ..... G06F 17/243; G06F 17/00; G06Q 40/103; G06Q 10/10
USPC .................................. 715/222–226; 358/505
See application file for complete search history.

(56) References Cited

U.S. PATENT DOCUMENTS 5,991,469 A    11/1999    Johnson et al.
(Continued)

FOREIGN PATENT DOCUMENTS

EP    1014254 A2    6/2000
(Continued)

OTHER PUBLICATIONS

European Examination Report, European Application No. 06003031.9, Feb. 2, 2009, 7 pages.
(Continued)

*Primary Examiner* — Kyle Stork
*Assistant Examiner* — Nicholas Hasty
(74) *Attorney, Agent, or Firm* — Patent Law Works LLP (57) ABSTRACT

A system and method for paper-based, automated completion of forms allows a user charged with filling out multiple forms containing some common information to write each unique piece of information one time, and the system generates a set of completed forms with the required information on each form with no change to the use or structure of the current forms. The control module is operable on a processor to determine a mapping between common fields on multiple forms or multiple pages of the same form, copy information written in a field on one form to equivalent fields on other forms, and produce a set of completed forms. The system is computationally simple and independent of language because these operations can be performed without having to understand, translate or convert the writing. Furthermore, there is no loss of security or privacy beyond the use of paper forms because these operations can be performed without access to a centralized database and without connectivity to other systems. The system is advantageous because it does not change paper based workflows since the inputs and outputs of this system are paper.

21 Claims, 8 Drawing Sheets

(56) References Cited

U.S. PATENT DOCUMENTS

| | | | |
|---|---|---|---|
| 6,025,200 | A | 2/2000 | Kaish et al. |
| 6,088,700 | A * | 7/2000 | Larsen et al. ............ 715/207 |
| 6,144,975 | A * | 11/2000 | Harris et al. ............. 715/203 |
| 6,411,972 | B1 * | 6/2002 | Parikh et al. ............. 715/209 |
| 6,585,154 | B1 | 7/2003 | Ostrover et al. |
| 6,651,217 | B1 * | 11/2003 | Kennedy et al. .......... 715/224 |
| 6,886,136 | B1 * | 4/2005 | Zlotnick et al. .......... 715/780 |
| 7,296,221 | B1 * | 11/2007 | Treibach-Heck et al. .... 715/224 |
| 7,542,160 | B2 * | 6/2009 | Parry et al. .............. 715/222 |
| 7,865,818 | B2 * | 1/2011 | Yamanakajima .......... 715/232 |
| 2002/0103826 | A1 * | 8/2002 | Kriho et al. .............. 707/505 |
| 2002/0141660 | A1 | 10/2002 | Bellavita et al. |
| 2002/0170973 | A1 | 11/2002 | Teraura |
| 2003/0025951 | A1 | 2/2003 | Pollard et al. |
| 2003/0106018 | A1 * | 6/2003 | Silverbrook et al. ....... 715/512 |
| 2004/0039988 | A1 * | 2/2004 | Lee et al. ................ 715/505 |
| 2004/0068693 | A1 * | 4/2004 | Rawat et al. ............. 715/507 |
| 2004/0078337 | A1 | 4/2004 | King et al. |
| 2004/0181749 | A1 * | 9/2004 | Chellapilla et al. ....... 715/505 |
| 2005/0002053 | A1 | 1/2005 | Meador et al. |
| 2005/0038756 | A1 | 2/2005 | Nagel |
| 2005/0163361 | A1 * | 7/2005 | Jones et al. .............. 382/135 |
| 2005/0289182 | A1 | 12/2005 | Pandian et al. |
| 2006/0047639 | A1 * | 3/2006 | King et al. .............. 715/513 |
| 2006/0242558 | A1 * | 10/2006 | Racovolis et al. ........ 715/511 |
| 2006/0242567 | A1 * | 10/2006 | Rowson et al. ........... 715/517 |
| 2006/0259983 | A1 * | 11/2006 | Sperry .................... 726/28 |

FOREIGN PATENT DOCUMENTS

| | | |
|---|---|---|
| JP | 04-135885 | 5/1992 |
| JP | 11272654 | 10/1999 |
| JP | 2001-034692 | 2/2001 |
| JP | 2002-120475 | 4/2002 |
| JP | 2002-245075 | 8/2002 |
| JP | 2003-0150585 | 5/2003 |
| JP | 2004348619 | 12/2004 |
| WO | WO 03/071850 A2 | 9/2003 |

OTHER PUBLICATIONS

European Search Report, European Application No. 06003031, May 24, 2006, 7 pages.

Non-Final Office Action, U.S. Appl. No. 11/223,768, Dated: Apr. 15, 2009, 24 pages.

Final Office Action, U.S. Appl. No. 11/223,768, Dated: Nov. 16, 2009, 21 pages.

Non-Final Office Action, U.S. Appl. No. 11/223,768, Dated: Mar. 29, 2010, 19 pages.

Final Office Action, U.S. Appl. No. 11/223,768, Dated: Aug. 3, 2010, 19 pages.

Japanese Office Action, Japanese Patent Application No. 2006-027204, Mar. 22, 2011, 4 pages.

U.S. Office Action, U.S. Appl. No. 11/223,768, May 9, 2011, 27 pages.

U.S. Patent Office Action, U.S. Appl. No. 11/223,768, Sep. 27, 2011, 28 pages.

Japanese Office Action, Japanese Patent Application No. 2006-027204, Oct. 25, 2011, 3 pages.

U.S. Patent Notice of Allowance, U.S. Appl. No. 11/223,768, dated Feb. 15, 2012.

* cited by examiner

NON-SYMBOLIC DATA SYSTEM FOR THE AUTOMATED COMPLETION OF FORMS

CROSS-REFERENCE TO RELATED APPLICATION

The present application is a continuation-in-part of U.S. patent application Ser. No. 11/223,768, filed Sep. 8, 2005 and entitled "Systems and Methods For Generating And Processing Evolutionary Documents," the entirety of which is hereby incorporated by reference.

BACKGROUND OF THE INVENTION

The present invention relates to processing techniques for multifunction peripherals (MFPs). More particularly, the present invention relates to systems and methods for paper based input to an MFP and the automated completion of forms.

It is common for users to be presented with multiple forms which request the same information. For example, in the case of a loan applicant, a mortgage broker may request multiple forms on behalf of different banks and government agencies to be filled out. Similarly, in the case of registration for a child at the school there may be a "registration form" for the local school, an almost equivalent "registration form" for the school district, an emergency contact form, and a release form for extra-circular activities, etc. Each form is likely to be formatted differently but contains many fields requesting the same information, e.g. name, address, social security number, phone numbers and employer name. The human user filling out the forms, hereafter referred to as the user, is required to waste time writing exactly the same information on multiple forms. Besides being inefficient, it is also frustrating to the user and leads to user leaving fields blank, use of excessive abbreviation, or increasingly poor hand writing, thus ultimately causing extra work for the form receiver and processor.

Various systems have been devised for automatic completion of electronic forms. For example, there are a variety of document management products that exist. These products are designed to assist with forms processing. These products allow blank forms to be scanned and identified. Fields from the blank form may be manually identified, named, and even have a type assigned, e.g. a numerical field. The products require the creation of a database to store information about the position of fields on the blank form and contents for each field. Some of these products are integrated with Optical Character Recognition (OCR) systems and provide Graphic User Interfaces (GUIs) for the correction of errors. Some products allow the newly recognized form to be printed or emailed or made accessible on the intranet or internet via a web interface. However, these products are designed to get information into a central database. These systems do not store the written information on the form but rather attempt to process it so that it can be converted to text and stored in the database. When provisions for helping the user exist, the user must interact with the electronic representations of the form, not paper.

Electronic forms are available in a variety of forms in the prior art including HTML, XML, PDF, and word processing formats. Browsers for HTML and XML forms provide automatic completion of form fields by matching the name of the field with the name of previous fields that have been filled in by the form filler. Unlike the present invention, these electronic form auto-completion systems universally require a display, keyboard or mouse input, and accept only symbolic input i.e. keyboard characters. Further these systems often pose a privacy or security threat because they save potentially sensitive information from the user for an unknown amount of time and unknown locations. For example, another user using the same device to fill out the same or different form may be shown the data entered by a previous user, including basic information such as the user's name as well as more sensitive information such as the user's social security number. Thus, there are significant security issues with such auto-fill functionality as well as a requirement that the data be keyed in by the user.

SUMMARY OF THE INVENTION

The present invention overcomes the deficiencies of the prior art with a system for paper-based, automated completion of forms. The system is particularly advantageous because it allows a user charged with filling out multiple forms containing some common information to write each unique piece of information one time, and the system generates a set of completed forms with the required information on each form exactly the way current forms are used. In one embodiment, the system of the present invention includes: a control module, a mapping & storage unit, a scanning module, a form identification module, a field extraction module, an output form selector, a composition module, a print module, a master form library and a form creation unit. The control module is operable on a processor to determine a mapping between common fields on multiple forms or multiple pages of the same form, copy information written in a field on one form to equivalent fields on other forms, and produce a set of completed forms. The system is computationally simple and independent of language because these operations can be performed without having to understand, translate or covert the writing. Furthermore, there is no loss of security or privacy beyond the use of paper forms because these operations can be performed without access to a centralized database and without connectivity to other systems. The system is advantageous because it does not change paper based workflows. The inputs and outputs of this system are paper. The present invention also includes a novel method for paper-based, automated completion of forms.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

A system and method for paper-based, automated completion of forms are described. Throughout this patent application, the terms document and form are used interchangeably to refer to a paper document having a data and fields thereon. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to a multifunction peripheral. However, the present invention applies to any type of computing device that includes an ability to capture images and output images.

Furthermore, the present invention is also described below primarily in the context of images. Those skilled in the art will recognize that the present invention is also applicable to any devices that input and or output non-symbolic data. For example, in one alternate embodiment, the present invention can be used with at tablet personal computer and a sytlus. The non-symbolic data input in this case is the data representing the movement of the sytlus as detected by the sensors in the touch panel of the tablet personal computer. In a second alternate embodiment, the present invention can be used with interactive paper (patterned paper with a printed dot pattern uniquely identifies the position coordinates on the paper) and a digital pen to create handwritten digital documents. The digital pen uses the pattern on the paper to store data points representing the handwriting and upload it to a computer for further processing. In this second embodiment, the non-symbolic data is the data stream generated by the digital pen which is a series of locations. In a third alternate embodiment, the present invention can be used with a clipboard and a location sensitive pen. The location sensitive pen generates a data points respresenting the movement of the pen relative to the clipboard. The data points in this third embodiment are the non-symbolic data. The data capture is an image, stream of data points or locations, which is not symbolic data like ASCII characters. Furthermore, the medium for these alternate embodiments may be the tablet's display, the paper or the the clipboard. For example, most of the prior art would try to convert the non-symbolic data to symbolic data using handwriting recognition.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System

Figure 1:
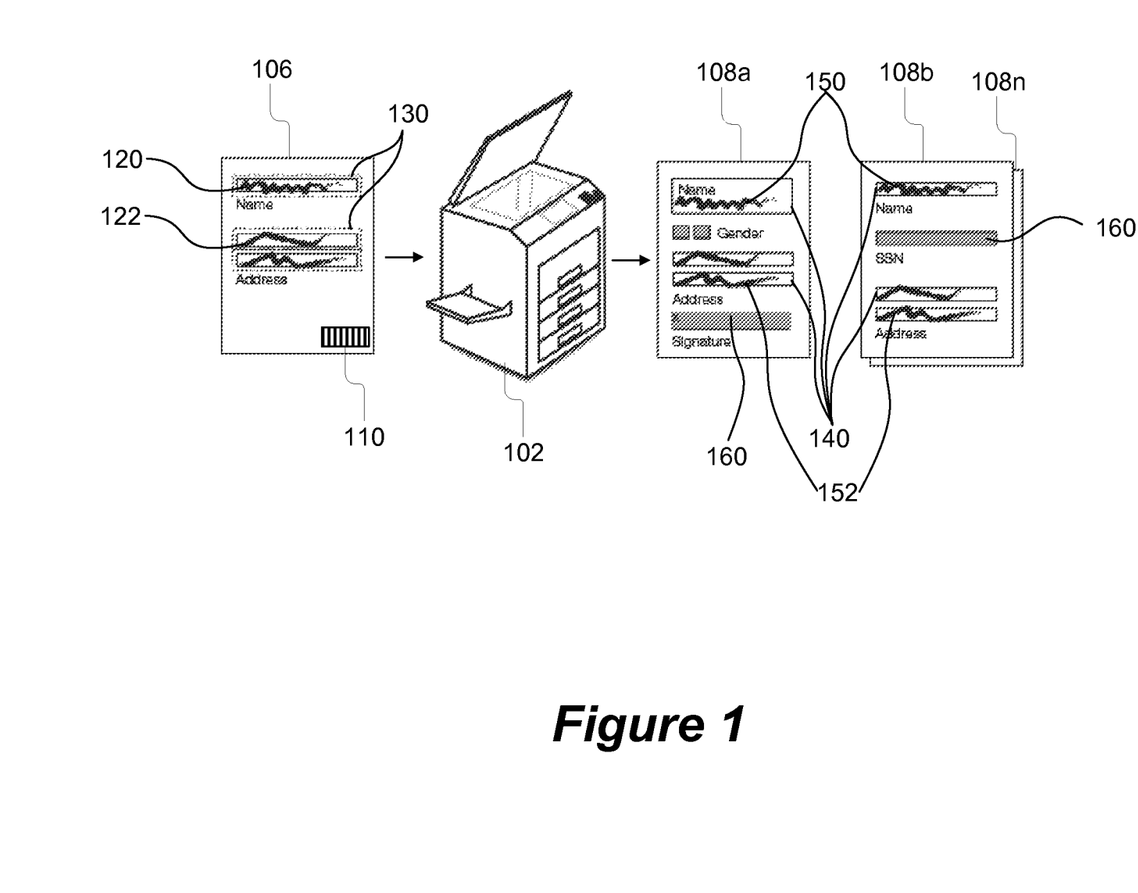
FIG. 1 is a functional diagram of an embodiment of a system including an automated form completion device of the present invention.

Referring now to FIG. 1, an embodiment of the paper based, automated form completion system 100 of the present invention is shown. In this embodiment, the system 100 comprises: a multifunction peripheral (MFP) 102, at least one input document 106 and at least one output document 108*a-n*. The system 100 allows multiple documents to be partially filled out on paper, scanned and reproduced with the marks from equivalent form fields reproduced on the other documents. The system 100 captures written information and creates an at least partially filled output document by scaling or processing and copying image data corresponding to fields to the appropriate location on the output document.

The system 100 of the present invention is particularly advantageous because it provides a number of benefits. First, it provides added security because the information from the input is not permanently saved on the device or at a central database. Further, a central database does not need to be accessed for user information. The information replicated between the input document and the output document need only exist while the replication is being done. In contrast, the prior art saves the information to a centralized database where it could be copied or stored for a long time to come. Second, the system 100 obviates the need to convert paper documents to electronic form, and works within a paper-based workflow. Most forms systems involve complete replacement of back-end processes so that paper forms are replaced by electronic versions and electronic access is required to the fill out documents or forms. In some cases (e.g., emergency contact cards), it is important to keep a paper based system which will not "go down" when a power outage or other "emergency" occurs. Third, the system 100 provides built in redundancy and distributed processing is simple. Because no access to a centralized database is required, forms can be automatically completed by independent devices. There is no single point of failure. If one multifunction peripheral 102 fails the load can be distributed to others. As the need for form completion grows additional devices can be added in the location needed without any need to restructure the central system, or increase communication bandwidth. Indeed form completion can take place without access to any form of communication network. Fourth, the data consistency within form sets is ensured. Because information items are only entered once there will not be different values for the same content on different documents. Because items are only entered once the user is less likely to experience fatigue and provide abbreviated information.

The present invention is directed to a paper based, automated form completion system 100 where users add something to a paper document 106, probably with handwriting, copies it, and receives a set of paper documents 108a-n with the handwritten information copied to corresponding fields on other paper documents 108a-n that require the same information. A typical example is shown in FIG. 1 in which a paper document 108 that includes information 120, 122 in fields 130 is copied on a multifunction peripheral 102 that includes or is part of the paper based, automated form completion system 100. In one embodiment, the multifunction peripheral 102 of the present invention uses a bar code 110 to identify the document 106 and the transformation that should be applied to it. The bar code 110 provides the mapping between scanned document images 120, 122 and the fields 130 to which they correspond. The data from these fields 130 can then be copied to corresponding fields 140 in the documents 108*a-n*, and the documents 108*a-n* can be printed. In another embodiment, the bar code 110 is a self-contained representation for the fields 130 on the document 106 and includes the instructions applied to them, and the multifunction peripheral 102 includes interpreter for logic embedded in the bar code. The bar code 110 could also contain instructions about which sets of forms to create, and what to do when fields are blank, and other options that could be confirmed on the user interface.

The document 106 in one embodiment includes a code 1 10. This code 110 is a machine-readable identification number that can be translated by the multifunction peripheral 102 into instructions or algorithms that are applied to create ensuing generations of the document 106. For example, as shown in FIG. 1, the document 106 with code 110 is input to the multifunction peripheral 102. Responsive to instructions from the user such as using a keypad of the multifunction peripheral 102, it generates one or more output documents 108*a-n*. Although not shown, these output documents 108*a-n* could include its own codes. These output documents 108*a-n* have their own form or format, and certain portions are modified during the reproduction process. For example, the information 120, 122 from the input document 106 is copied to corresponding fields 140 as information 150, 152 in the output documents 108*a-n*. In another embodiment, the code 110 may instruct the multifunction peripheral 102 generates the output documents with selected fields highlighted 160 where such information is missing. Those skilled in the art will also recognize how other information (not shown) such as signature may be redacted or blacked out in the output forms.

Figure 2:
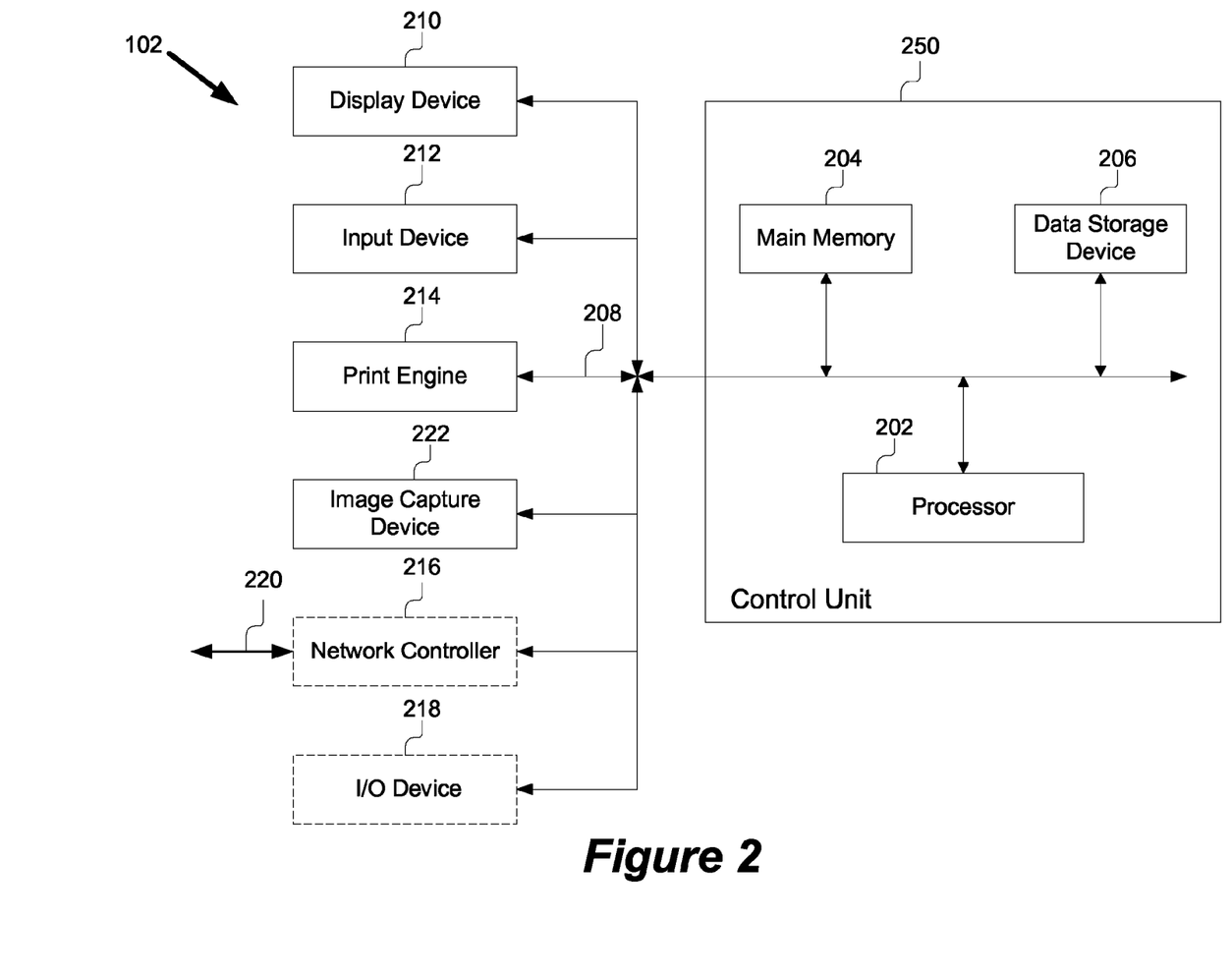
FIG. 2 illustrates a block diagram of a system configured in accordance with an embodiment of the present invention.

Referring now also to FIG. 2, a functional block diagram of the multifunction peripheral 102 configured in accordance with an embodiment of the present invention is shown. The multifunction peripheral 102 preferably comprises a control unit 250, a display device 210, an input device 212 and a print engine 214. The multifunction peripheral 102 may optionally include a network controller 216 and one or more input/output (I/O) devices 218.

The control unit 250 comprises an arithmetic logic unit, a microprocessor, a general purpose computer or some other information appliance equipped to provide electronic display signals to display device 210. In one embodiment, the control unit 250 comprises a general purpose computer having a graphical user interface, which may be generated by, for example, a program written in Java running on top of an operating system like WINDOWS® or UNIX® based operating systems. In one embodiment, one or more application programs are executed by control unit 250 including, without limitation, drawing applications, word processing applications, electronic mail applications, financial applications and web browser applications.

Still referring to FIG. 2, the control unit 250 is shown including processor 202, main memory 204 and data storage device 206, all of which are communicatively coupled to system bus 208.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIG. 3.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the input device 212, the print engine 214, the network controller 216 and the I/O device(s) 218.

Display device 210 represents any device equipped to display electronic images and data as described herein. In one embodiment, the display device 210 is a liquid crystal display (LCD) and light emitting diodes (LEDs) similar to those on many conventional multifunction peripherals to provide status feedback, operation settings and other information to the user. In other embodiments, the display device 210 may be, for example, a cathode ray tube (CRT) or any other similarly equipped display device, screen or monitor. In one embodiment, display device 210 is equipped with a touch screen and/or includes a digitizer in which a touch-sensitive, transparent panel covers the screen of display device 210.

In one embodiment, the input device 212 is a series of buttons coupled to control unit 250 to communicate information and command selections to processor 202. The buttons are similar to those on any conventional multifunction peripheral. In another embodiment, the input device 212 includes a keyboard. The keyboard can be a QWERTY keyboard, a key pad, or representations of such created on a touch screen. In yet another embodiment, the input device 212 includes cursor control. Cursor control represents a user input device equipped to communicate positional data as well as command selections to processor 202. Cursor control 212 may include a mouse, a trackball, a stylus, a pen, a touch screen, cursor direction keys or other mechanisms to cause movement of a cursor.

The print engine 214 is of a conventional type and is coupled to bus 208 for communication with the processor 202. The print engine provides 214 conventional printing capabilities to generate and output printed documents based on data and commands from the processor 202.

As denoted by dashed lines, the multifunction peripheral 102 may optionally include the network controller 216 and one or more input/output (I/O) devices 218 such as described below.

Network controller 216 links control unit 250 to a network 220 that may include multiple processing systems. The network of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art.

One or more I/O devices 218 are coupled to the bus 208. These I/O devices may be part of multifunction peripheral 102 in one embodiment and in another embodiment may be part of the other systems (not shown). For example, the I/O device 218 can include an image scanner for capturing an image of a document. The I/O device 218 may also includes a printer for generating documents. In such an embodiment, the print engine 214, the input device 212 and the display device 210 can be replaced by connections to a scanner and a printer via the I/O device 218. The I/O device 218 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that system 100 may include more or less components than those shown in FIG. 2 without departing from the spirit and scope of the present invention. For example, system 100 may include additional memory, such as, for example, a first or second level cache, or one or more application specific integrated circuits (ASICs). Further, most multifunction devices or copiers include multiple data buses rather than the single bus 208. Multiple buses allow fast transfer of image data from a scanning device to the printing device, and simultaneous data transfer of user interface information to a display device, for example. Similarly, additional components input/output devices 218 may be coupled to control unit 250 including, for example, an RFID tag reader, digital still or video cameras, or other devices that may or may not be equipped to capture and/or download electronic data to control unit 250. One or more components could also be eliminated such as the keyboard & cursor control 212.

Figure 3:
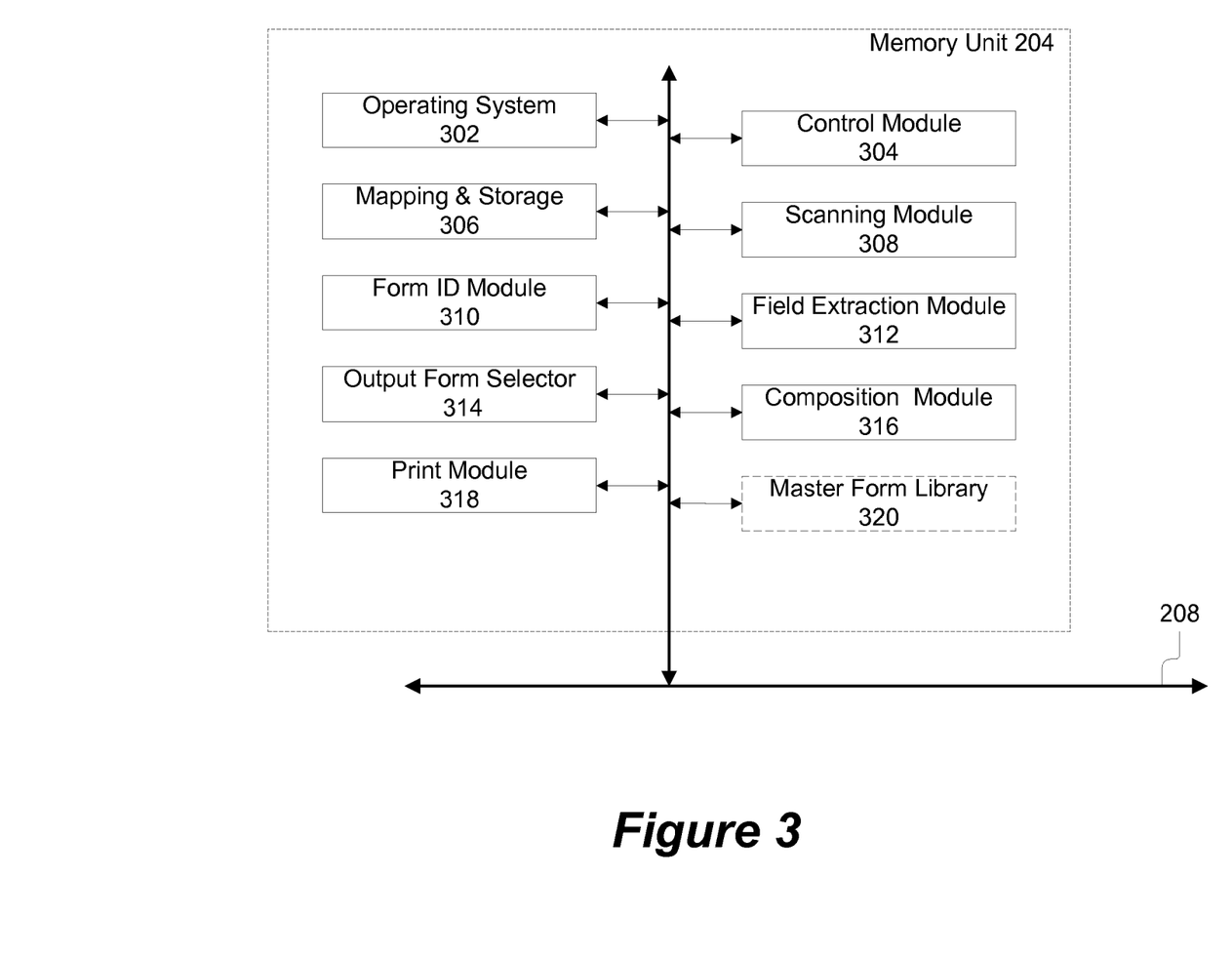
FIG. 3 illustrates a block diagram of a memory of the system of FIG. 2 configured in accordance with an embodiment of the present invention.

FIG. 3 is a block diagram of one embodiment of the memory unit 204 for the system 100. The memory unit 204 preferably comprises: an operating system 302, a control module 304, a mapping & storage unit 306, a scanning module 308, a form identification module 310, a field extraction module 312, an output form selector 314, a composition module 316, a print module 318 and a master form library 320. Those skilled in the art will recognize that the memory 204 also includes buffers for storing images of handwriting temporarily until the output documents 108a-n have been generated. As noted above, the memory unit 204 stores instructions and/or data that may be executed by processor 202. The instructions and/or data comprise code for performing any and/or all of the techniques described herein. These modules 202-214 are coupled by bus 208 to the processor 202 for communication and cooperation to system 100. Those skilled in the art will recognized that while the present invention will now be described as modules or portions of a memory unit 204 of a computer system 100, the modules or portions thereof may also be stored in other media such as permanent data storage device 206 and may be distributed across a network 104 having a plurality of different computers such as in a client/server environment.

The operating system 302 is preferably a custom operating system that is accessible to user via an appplication interface. In an alternate embodiment, the operating system 302 is one of a conventional type such as, WINDOWS®, SOLARIS® or LINUX® based operating systems. Although not shown, the memory unit 204 may also include one or more application programs including, without limitation, drawing applications, word processing applications, electronic mail applications, financial applications and web browser applications.

The control module 304 is used to control the other modules of the memory 204. The control module 304 is adapted for control of and communication with the mapping & storage unit 306, the scanning module 308, the form identification module 310, the field extraction module 312, the output form selector 314, the composition module 316, the print module 318 and the master form library 320. The operation of the control module 304 will be apparent from the description of FIG. 8 below. While the control module 304 is shown as a separate module of the memory 204, those skilled in the art will recognize that the control module 304 in another embodiment may be distributed as routines in the other modules 306-320.

The mapping & storage unit 306 is software and routines for creating and storing a mapping of fields among one or more documents. In one embodiment, the mapping & storage unit 306 identifies corresponding fields on multiple documents as will be described below with reference to FIGS. 5 and 6. The operation of the mapping & storage unit 306 is described in more detail below with reference to steps 1002 and 1004 of FIG. 8. In general, the mapping & storage unit 306 creates mappings of fields in different documents so that input information can be copied among a set of matching fields. The field correspondence information can be stored and accessed in a variety of ways. In one embodiment, the mapping & storage unit 306 stores the mappings in the memory 204. In another embodiment, the mapping & storage unit 306 creates 2-dimensional bar codes with the mapping and document identification information in the bar code. The barcode is added to each form with the coordinates of each field and the name of the field stored in the barcode. This information allows the MPF 102 to deal with forms it had never encountered, by copying the marks for an identified field and printing them on a subsequent form with the same field name. Barcodes can also be used to access databases storing form field locations and names. In other embodiments, the form type is identified without use of a bar code by determining the location and sizes of fields from a scan, accessing a database of forms, and matching the field sizes and locations with those stored in the database. The database can then return the field names. Form recognition and field recognition can also match between forms based on the information provided to a human to help fill out the form, e.g. a field may be labeled "address" for the benefit of the form user and this label and its location can be used for matching. The mapping & storage unit 306 is coupled to the bus 208 for communication and interaction with the processor 202 and other modules.

The scanning module 308 is software and routines for scanning and storing for processing the original documents 108a-n as well as the partially completed document 106. In one embodiment, the scanning module 308 captures images of a paper documents 106 and 108 input to the MPF 102. The operation of the scanning module 308 is described in more detail below with reference to step 1005 of FIG. 8. In one embodiment, the scanning module 308 stores the forms in the memory 204. The scanning module 308 is coupled to the bus 208 for communication and interaction with the processor 202 and other modules.

The form identification module 310 is software and routines for identifying an input form and associated output forms. In one embodiment, the form identification module 310 uses a machine readable code to determine the input document. In another embodiment, the form identification module 310 uses pattern recognition software to determine the input form. The operation of the form identification module 310 is described in more detail below with reference to step 1012 of FIG. 8. The form identification module 310 is coupled to the bus 208 for communication and interaction with the processor 202 and other modules.

The field extraction module 312 is software and routines for identifying the relationship between fields, the input document and the output document. The field extraction module 312 also extracts the handwritten information from the input form so that it may be replicated on the output forms. In one embodiment, the field extraction module 312 decodes the machine readable code to determine the fields and output documents. In another embodiment, the field extraction module 312 accesses the mapping & storage unit 306 to look up the information. In yet another embodiment, the mapping & storage unit 306 accesses a server or other file to retrieve the data. The operation of the field extraction module 312 is described in more detail below with reference to steps 1014 and 1016 of FIG. 8. The field extraction module 312 is coupled to the bus 208 for communication and interaction with the processor 202 and other modules.

The output form selector 314 is software and routines for identifying output forms to be completed. The operation of the output form selector 314 is described in more detail below with reference to step 1018 of FIG. 8. The output form selector 314 is coupled to the bus 208 for communication and interaction with the processor 202 and other modules.

The composition module 316 is software and routines for method composing the output form with scaled and repositioned marks. The operation of the composition module 316 is described in more detail below with reference to step 1020 of FIG. 8. The composition module 316 is coupled to the bus 208 for communication and interaction with the processor 202 and other modules.

The print module 318 is software and routines for outputting the output forms. In one embodiment, the print module 318 interacts with the print engine 214 to print the output forms. In another embodiment, the print module 318 creates and transfers an electronic version of the output form such as in PDF form. The operation of the print module 318 is described in more detail below with reference to step 1022 of FIG. 8. The print module 318 is coupled to the bus 208 for communication and interaction with the processor 202 and other modules.

The master forms library 320 is data storage for storing master forms 600, 700 (See FIGS. 7 and 8) and for storing originals of output documents. In one embodiment, the present invention uses currently existing forms. However, it may be that some fields appear only one form and other fields appear only on another form. Thus to fill out all the forms a user would need to provide all the information for one form and some information for a second form. In these cases, it is advantageous to have a master form for a set of forms that includes all the unique fields from the set of forms. A user therefore would only need to fill out the master form 600, 700. Data from the master form 600, 700 is copied to all of the other forms. Use of a master form can provide a further advantage when the original forms do not have clearly bounded fields, and are crowded and thus difficult to extract the marks. A master form can be cleanly designed providing a bounding box and indicating a type of response for each field. The master-form itself can be colored to easily distinguish marks made by the user.

An additional use of the "master form" is to provide translation. In this use, the original form is in one language, typically the language of the form receiver, but the user may not speak the original language of the form. A master form can be designed with equivalent fields in the second language of the user. The master form can be filled out, and "copied", and the copying operation moves only the filled out data onto the original form. Thus both the user and the form receiver see the field names and instructions in their native language. The content of the fields is not translated, but in many cases this is not necessary, for example for an embarkation card when entering a country is filled out with the name and intended address and return date of the form filler, none of which need be translated.

Sample Input and Output Forms or Documents

Figure 4:
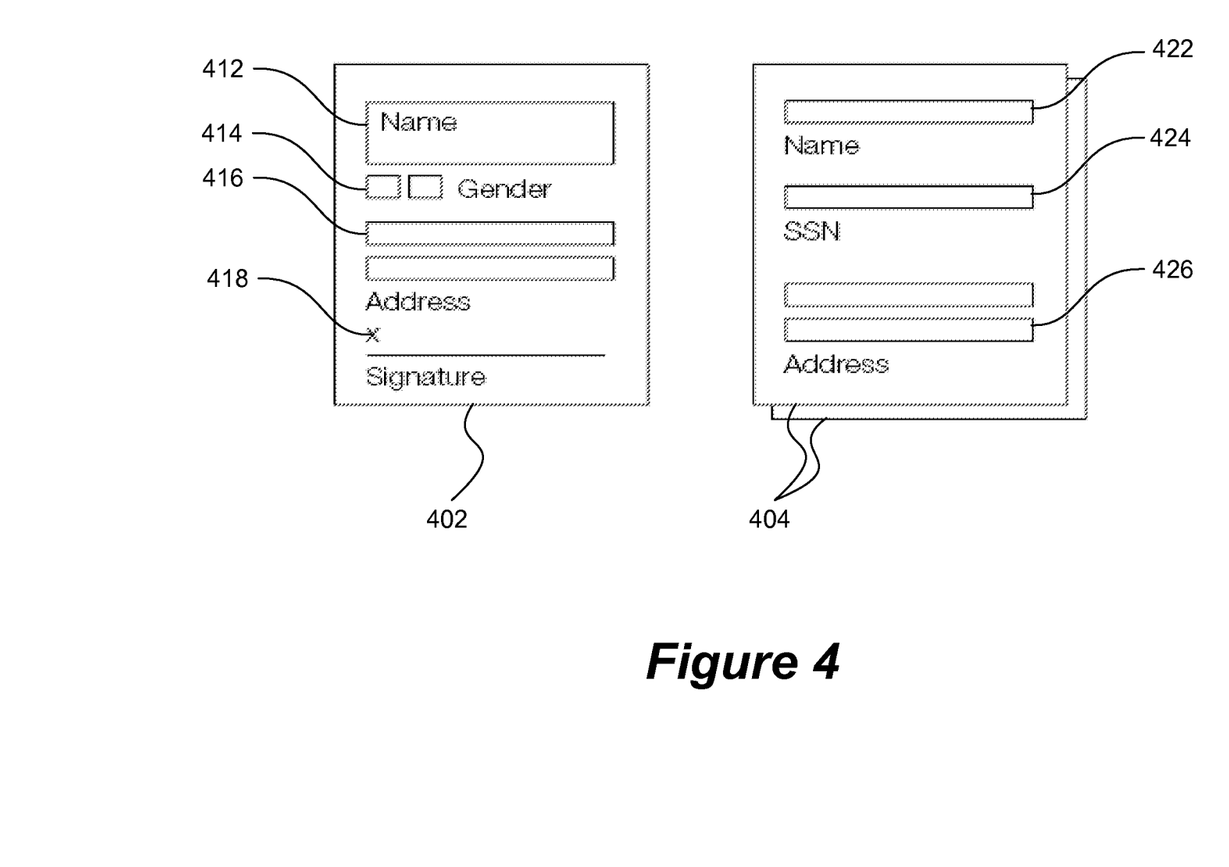
FIG. 4 is a graphical representation of an example first form and an example second form that include common information in accordance with an embodiment of the present invention.

Referring now to FIG. 4, an example first form 402 and an example second form 404 that include common information are shown. A form or document 402, 404 here refers to a page or pages designed to receive information from a user with a writing instrument. The locations designed to receive distinct pieces of information are called fields. The fields could be meant for printed characters, numbers only, cursive strings (e.g., a signature), check boxes, bubbles to be filled in or any type of mark typically made on a page. As shown in FIG. 4, the first form 402 includes a plurality of fields 412, 414, 416 and 418; and the second form 404 has fields 422, 424 and 426. The fields 412, 414, 416, 418; 422, 424 and 426 in the different forms may be sized, positioned and formatted differently. Both form 402 and Form 404 have a name field 412, 422 and two address fields 416, 426. Form 402 has a gender field 414 and a signature field 418 neither of which appears on form 404. Form 404 has a social security number (SSN) field 424 that doesn't appear on form 402.

Figure 5:
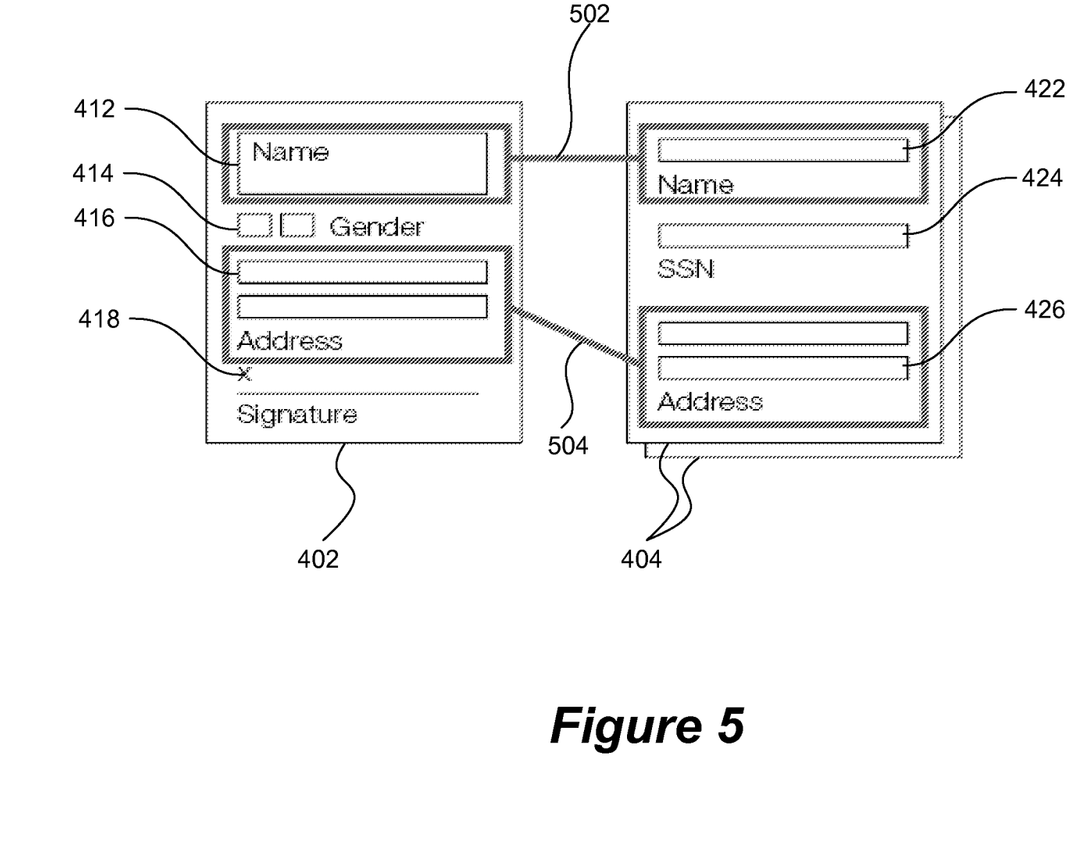
FIG. 5 is a graphical representation of the first form and the second form illustrating the relationship of common information in accordance with an embodiment of the present invention.

Referring now to FIG. 5, the first form 402 and the second form 404 illustrate the relationship of common information and equivalent fields 502, 504 identified. Note that the fields 412, 422, may be in similar locations on the form, or they may be in different locations and have different sizes. The boundaries of the fields might be delimited in different manners. The labels for the equivalent fields might also be specified in different ways: the font might be different, the name might be different e.g. "SSN" on one field and "Social Security Number" on the field on a different form. The language of the forms might even be different. However, FIG. 5 illustrates the mappings 502, 504 of equivalent fields between particular forms. Those skilled in the art will understand how a user could identify such mappings and how graphical user interfaces that appear as shown in FIG. 5 could be presented to the user to establish such mappings.

Figure 6:
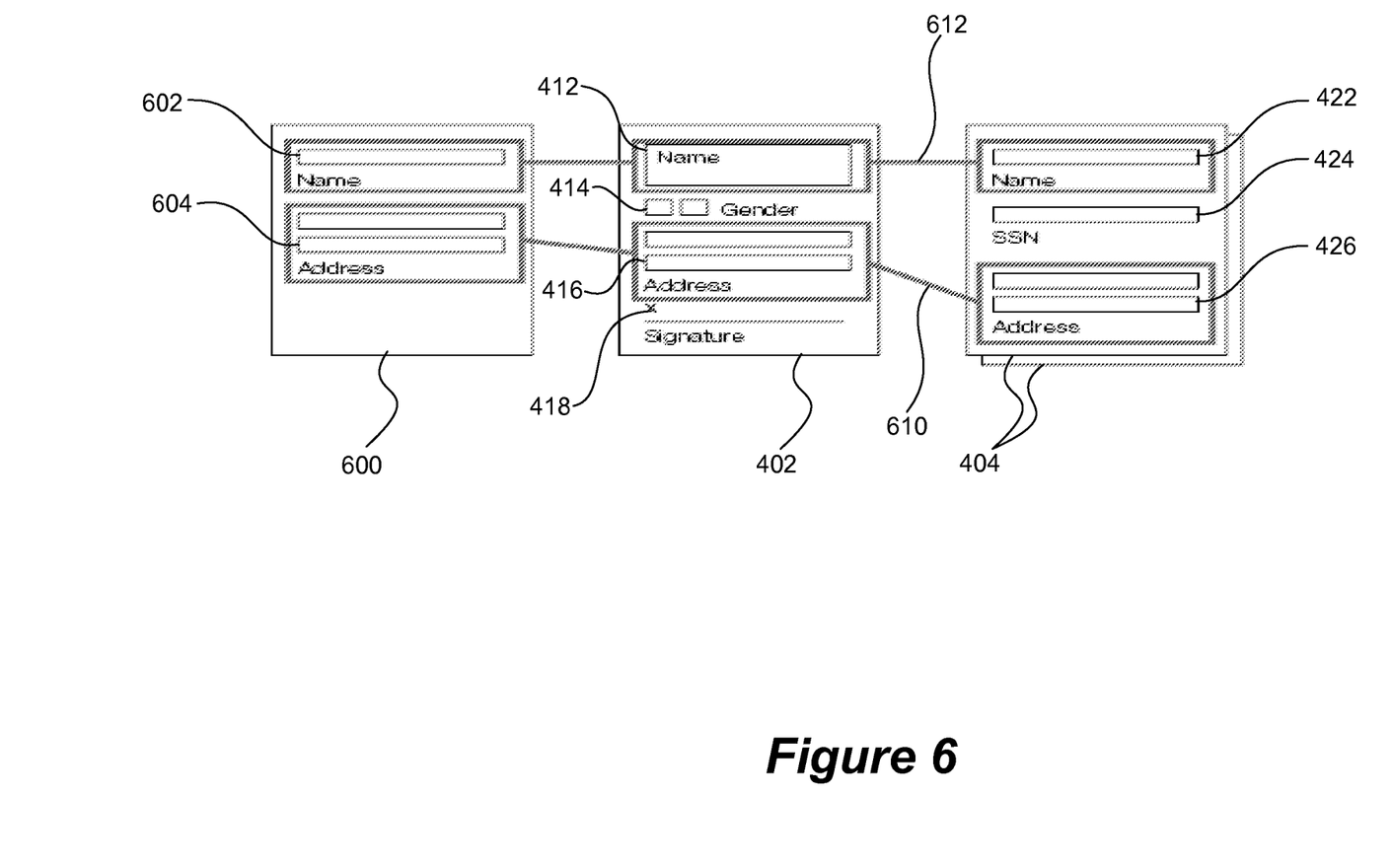
FIG. 6 is a graphical representation of an embodiment of a master form, the first form and the second form illustrating the relationship between common information in accordance with an embodiment of the present invention.

Referring now to FIG. 6, an embodiment of an optional master form 600, the first form 402 and the second form 404 illustrating relationships 610, 612 between common information is shown. The master form 600 is not part of the original set of forms 402, 404, and it is created by the system 102 for convenience and contains fields 602, 604 appearing on a set of forms 402, 404. For example, the master form 600 in FIG. 6 includes those fields 602, 604 that appear on both forms 402 and 404. In other words, the optional master form 600 includes an intersection of the fields in form 402 and form 404.

Figure 7:
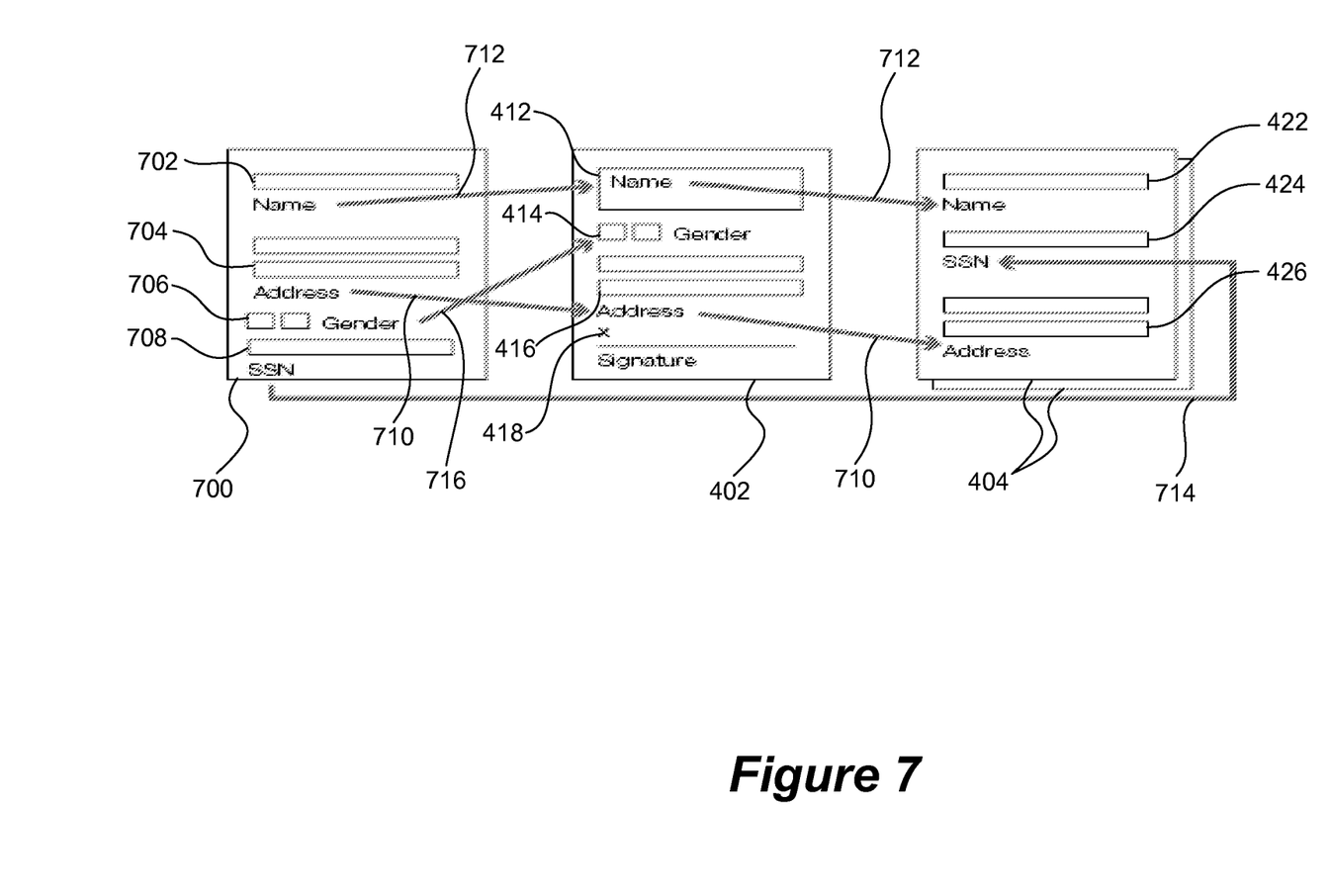
FIG. 7 is a graphical representation of another embodiment of a master form, the first form and the second form illustrating the relationship between common information in accordance with an embodiment of the present invention.

Referring now to FIG. 7, another embodiment of a master form 700, the first form 402 and the second form 404 illustrating the relationship 712, 710 between common information, and the relationships 714, 716 to the master form 700 are shown. The master form 700 in FIG. 7 shows includes similar fields 702, 704, 706 and 708 to the unique fields form 402 and 404, except for the signature field 418 from form 402. In other words, the optional master form 700 includes a union of the fields in form 402 and form 404.

Referring back now also to FIG. 1, the completed master form 106, the multifunction device 102 and a set of partially completed output forms 108a-n. In one embodiment, the completed master form 106 is placed on the multifunction device 102 and scanned; and partially completed forms 108a-n are produced. Those areas that have not been completed are highlighted 160 by changing the color of the output. This makes it easy for the user to scan the partially completed form and provide the additional unique information still required for the individual forms. Those skilled in the art will recognize that if the user were to use the master form 700 of FIG. 7 and all information was completed in that from there would not be highlighting on the output as that form includes all the information necessary to fill all the fields on the output set of forms 108a-n. Those skilled in the art will also recognize that some fields such as the signature 418 may be set so that information in them is not copied as it may be desired to force the user to sign each form after they have been produced by the present invention. Furthermore, those skilled in the art will recognize that the present invention takes advantage of the wide spread knowledge of how to interact with a copy machine and has the same interface for interaction with the user.

Method

Figure 8:
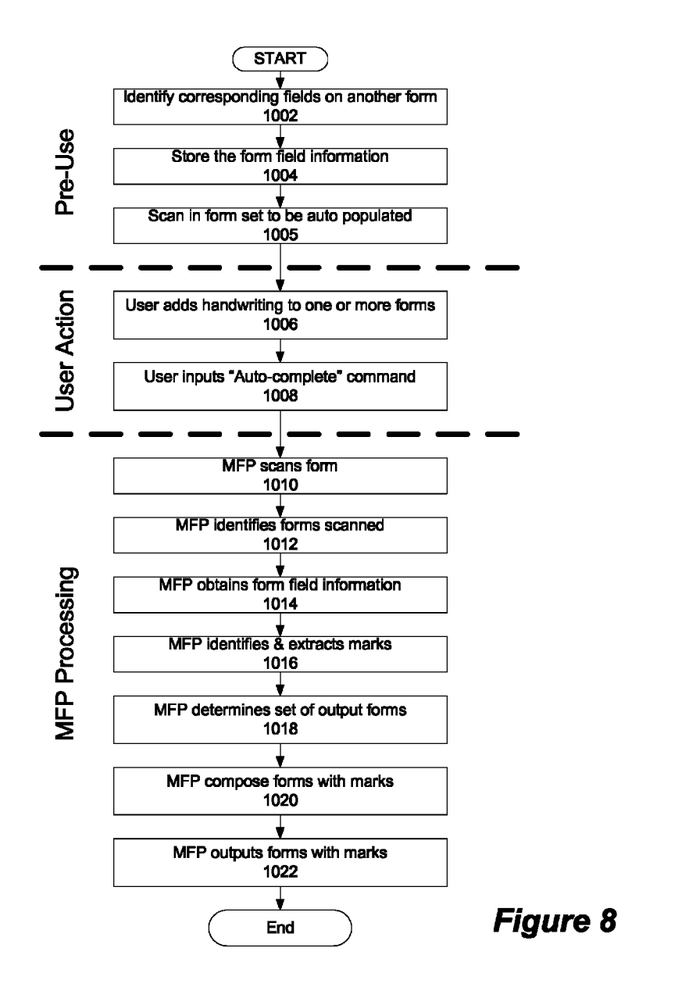
FIG. 8 is a flow chart of an embodiment of a method for automated completion of forms in accordance with the present invention.

Referring now to FIG. 8, an embodiment of a method for automated completion of forms in accordance with the present invention will be described. The method of the present invention includes a first group of steps (e.g., 1002, 1004) that are performed once to initialize the process for a set of forms. These steps 1002, 1004 are referred to in the flow chart as pre-use steps and can be performed anytime before the remaining steps and are part of the initialization of the method. A second group of steps 1006, 1008 are performed by the user to set the conditions and input commands under which the automatic form processing will be performed. These steps are referred to in the flow chart of FIG. 8 as user actions since they are performed by the user. Finally, a third group of steps 1010-1022 complete the method of the present invention. While these steps are described with only one pass through these steps, they could be performed repeatedly indefinitely for each set of forms that the user wants to automatically complete.

The embodiment of the method for automated completion of forms begins by identification 1002 of corresponding fields on multiple documents or forms. For a set of documents it is necessary to determine the fields that are equivalent on the set of documents, and the location of the bounding box for the form field. In one embodiment, this information can be represented by a list of unique fields, where each field includes a unique field identifier, a list of the documents the field appears on, the offset of the field from some reference point, and a width and height of the field on that document. For example, some of the information from FIG. 4 might be described with the following set of descriptors: (FIELD-ID, FORM-ID, X-OFFSET, Y-OFFSET, X-SIZE, Y-SIZE, FORM-ID, X-OFFSET, Y-OFFSET, X-SIZE, Y-SIZE). These might be stored in a text file as follows: "NAME", "FORM 402", 1, 1, 3, 0.5, "FORM 404", 1, 1, 3, 0.25 "ADDRESS1", "FORM 402", 1, 5, 3, 0.5, "FORM 404", 1, 7, 3, 0.25. The offset could be measured in any units desired and from any reference point; in this case they are listed in inches from the top left corner of the page. In some embodiments more accuracy may be obtained by measuring from a fiduciary mark on the document, or some other easily identifiable location. In the above example, sizes are listed in inches. In other embodiments, it is desirable to store information independently for each document. In this case, the same information for FORM 402 might be stored as: "NAME", 1, 1, 3, 0.5; "ADDRESS1", 1, 5, 3. 0.5. In some cases additional information might be stored about the form field, for example, the type of field, or some verification information (e.g., the field is required to be filled out or the field must contain a number). The location of fields on a document and the correspondence between fields can be determined in a variety of ways. In one embodiment, a user acts as "form designer" to: scans the document, use a graphical user interface to identify the regions, provide a unique identifier for fields that are different and provide a common identifier for fields that are the same. Note that while a screen display can be used to determine the field locations and correspondence between fields, there is requirement that the user use a screen to fill out a form.

In another embodiment, the location of fields and the correspondence between fields is determined automatically. To determine the location of a field the form may be scanned, and image recognition software can detect rectangles e.g. 412, 414, 416, 422, 424, and 426. The labels for these fields can be determined by using Optical Character Recognition (OCR) on the printed labels near the rectangles, e.g. "Name" below box 422, or in the rectangles e.g. "Name" in 412. In some cases forms do not have rectangular regions e.g. 418. In some cases regions of a form to be filled out are "colored" or "shaded." These regions can also be easily detected with image processing, especially if the shade or color is provided. Automated attempts to locate fields without rectangles or shading may be made by region growing. Regions of white space (no printed characters) which are rectangular and of a size somewhat larger the the printed material on the document are good candidates for fields. Horizontal rules as in 418 are also good indications of location to examine for a region of white space and possible form field. In the case of automatic field recognition it is useful to have a mechanism for human input to verify the locations and labels that have automatically been extracted. For the form matching operation it is useful to make use of a set of commonly used terms on a form. For example, fields labeled "Sex" and "Gender" may be matched using such a dictionary. Note that the field location and naming step need only be performed once per form or per set of forms, regardless of the number times the forms are filled out and copied.

Once the fields have been identified 1002 and matched between documents, this form field information is stored 1004. The information about field correspondence is stored for later use by the MFP 102. In one embodiment, the field information is stored in a 2-D barcode and printed on the input form. However, in some cases the original form cannot be changed. In those cases, the field information is stored in a data file and loaded onto the MFP 102 intended to be used for form completion of that particular form. In another embodiment, where the MFP 102 includes a network connection, the information may be downloaded from a server, the WWW, a PDA, mobile telephone, or any other device since this data file will typically be very small in size. When the master form 600, 700 is used the field information from multiple forms could be stored on the master form or in the master form library 320. Since the master form is typically defined after the original forms, space can be allocated for a 2-D barcode on the master form.

Next the method scans 1005 and stores forms for automatic completion. The forms that are to be completed can be scanned 1005 by the multifunction peripheral 102 and during scanning identified by the user as such. For example, referring to FIG. 1, blank version of documents 108*a-n* would be scanned in this step. Alternatively, a "master form" might be scanned and the identifier on the master form could determine which "original forms" should be filled out and printed. For example, a TWAIN driver can be used to obtain a TIFF or JPEG image file from the scanner. Some multifunction peripherals 102 may support other interfaces to scanning including web-services or custom drivers.

Once the system 100 has been initialized, the user can interact with the system. The user prints out documents from this MFP 102 or another. The user then adds 1006 handwriting to one or more forms as they would normally complete any conventional form. In an alternate embodiment, the user may be provided with a master form as has been described above. Such a master form would be similarly completed 1006 with handwriting by the user. Then the user places the forms 106 with handwriting into the MFP 102 and selects 1008 an "auto-complete" command in very much the same way the user would make do if they were making copies of the forms 106 with handwriting.

Next, the MFP 102 scans 1010 the input forms 106, and stores them in memory 204. Once the input forms 106 have been scanned, the forms received are identified 1012. In one embodiment, the forms are identified contemporaneously with scanning. In embodiments where the input form 106 includes a machine readable code 110 (e.g., barcode), code recognition and decoding software can be used to determine if a form contains a code, and obtain the value of the data stored in the code. In this case, the barcode includes the output forms that need to be completed and the fields that need to be completed, and the locations on the input document from which to extract the information as has been described above with reference to step 1002. On the other hand, if the input document does not have any machine readable codes, the form must be identified, and the output forms that need to be completed and the fields that need to be completed, and the locations on the input document from which to extract the information are determined from a data file or similar source. There are form recognition systems that can determine which form has been scanned without machine readable identifiers. Once the form has been identified the field information can be looked up either on the local machine, from a server, or from a barcode on another scanned form.

After identifying 1012 the input form, the MFP 102 obtains 1014 form field information. Depending on how the form correspondence information was initially stored, it is accessed. If it was stored as machine readable information, that information can be decoded after the scanning step 1010. If the information was stored on the MFP 102, it can be looked up in the mapping & storage unit 306 given the identified forms. If the information was stored in a centralized database, that database can be accessed with the form identification information. Those skilled it the art will recognize that the MFP 102 may use multiple methods of accessing the correspondence information, and might use different methods for different forms within the same set.

Once the form field information has been obtained 1014, the method identifies and extracts 1016 marks corresponding to the fields. For each form that was scanned, the fields on the form are examined to determine if the user has provided information for that field on that form. If marks have been provided, the contents of the field are stored. The contents can be extracted by loading the image scan, e.g. a TIFF or JPEG into memory, and using an image processing tool kit, e.g. the Java Advanced Imaging toolkit to crop the regions corresponding to completed fields. If an image format, e.g. JPEG 2000 is used, which allows access to parts of the data; it is not necessary to load the entire image in memory. In one embodiment, additional image processing is performed, like the removal of "noise" that might occur in the scanning process or the removal of background form elements that might have been part of the original form.

Next, the method determines 1018 the set of output forms to be output. In one embodiment, the same forms that are input will be output. In another embodiment, use of a particular master form indicates which "original forms" should be output. In another embodiment the user might specify with a keyboard or touch panel the forms to be filled out from the input data. In yet another embodiment, the user may be prompted on a form by form basis whether particular forms should be completed and output.

Once the output forms have been identified 1018, the method composes 1020 the output form with scaled and repositioned marks. Because the size of a field, e.g. "Name" may be different on the input and output form, it may be necessary to resize the image data before compositing with the output form. One simple scaling rule is to scale the input field independently horizontally and vertically so that it becomes the same size as the output field. Better quality is usually obtained by maintaining the aspect ratio of the input field and scaling by the same amount horizontally and vertically until the field fits in the output form. Even better quality is usually obtained by computing the bounding box of just the marked area in the input form, and scaling that information while maintaining the aspect ration to fit in the output field. Those skilled in the art will recognize that the system 102 may include a set of rule or use simple interpolation for scaling and resizing. For each form to be output all of the fields must be determined. If the user provided data for a field that field filled out. If there is no data provided by the user, the field identifier is used to determine other forms with the same field, if data was provided in an equivalent field on another form; the scanned data from that field is scaled to fit in the current form's field position. If no scanned form contains data for the field, the field may be reproduced empty, or it might be reproduced with a color background (highlighting), or some other indication that the field still needs to be filled in. The output form can be generated as a raster image, in this case the scan of the output form is loaded into memory and data that has been scanned from other forms is pasted into the form fields using an image processing toolkit, like the Java Advanced Imaging toolkit. The initial form might be loaded from a collection of black forms rather than from an image scan. The output form can also be generated as a sequence of drawing commands. For example, the structure of an output form can be rendered with PDF drawing commands; the contents of form fields are then stored in a PDF file as image objects.

Finally, once the output forms have been composed 1020, they are printed using the print engine 214 and output by the MFP 102. In another embodiment, a PDF or other electronic version is generated. If an electronic version of the form is maintained this form might have some of the original information about scanning or other metadata stored in XMS or another format for metadata. In such a case, the electronic version can be emailed, stored at a location in a file system or otherwise transferred according to input from the user as desired.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system for automatic completion of forms, the system comprising:
   one or more processors;
   a memory;
   an input device coupled to the one or more processors and the memory and adapted to receive an input document including a union of all fields from output documents, handwritten information and a machine-readable code identifying the input document, at least one field on the input document, a location for each of the at least one fields on the input document and the output documents for automatic completion, wherein at least two of the output documents are different, the input device having an output;
   an automatic completion device coupled to the one or more processors and the memory for reading the machine-readable code identifying the input document, the at least one field on the input document, the location for each of the at least one fields on the input document and the output documents for automatic completion, wherein at least two of the output documents are different, extracting markings including the handwritten information corresponding to the at least one field identified at the location from the input document for replicating on the output documents and creating the output documents with the extracted markings including the handwritten information scaled horizontally and vertically by a fixed length to maintain an aspect ratio corresponding to the at least one field on the input document, copied and repositioned to fit at least one corresponding field in the output documents in addition to having at least one incomplete field highlighted with a color and at least one completed field redacted in the output documents, the automatic completion device having an input coupled to the output of the input device and an output to provide the output documents; and
   a mapping and storage unit coupled to the automatic completion device, the mapping and storage unit for mapping fields between the input and the output documents.

2. The system of claim 1, wherein:
   the input device receives a second input document including additional written information and a second machine-readable code identifying the second input document and at least one field on the second input document; and
   the automatic completion device reads the second machine-readable code, identifies the second input document, and extracts markings including the additional handwritten information corresponding to the at least one identified field on the second input document, the output documents having at least one additional corresponding field with extracted markings.

3. The system of claim 1, wherein:
the input device receives a second input document including additional written information and machine-readable code identifying the second input document and at least one field on the second input document; and
the automatic completion device reads the second input document's machine-readable code, identifies the second input document, extracts markings including the additional handwritten information corresponding to the at least one identified field on the second input document, and creates a second output document including at least one additional corresponding field with extracted marking.

4. The system of claim 1, wherein:
the input document includes a plurality of fields; and
the automatic completion device extracts markings corresponding to the plurality of fields, the automatic completion device generates the output documents, each output document including corresponding fields with extracted markings corresponding to one of the plurality of fields.

5. The system of claim 1, wherein the output documents include their own machine-readable codes.

6. The system of claim 1, wherein:
the input device receives a second input document; and
the automatic completion device identifies the second input document by determining a location and a size of each field from a scan, accessing a database of forms and matching the location and the size of each field with a form in the database.

7. The system of claim 1, wherein the mapping and storage unit includes one from the group of a server, a data storage device that is part of a multifunction peripheral device, a data file stored in a memory or a central database.

8. The system of claim 1, further comprising a scanning module for scanning and processing an original document, the scanning module coupled to the automatic completion device.

9. The system of claim 1, wherein the input document is an image of a scanned document.

10. The system of claim 1, further comprising a field extraction module for identifying a relationship between the fields of the input document and the corresponding fields of the output documents, the field extraction module extracting handwritten information from the input document for replication to the output documents.

11. A method for automatic completion of forms, the method comprising:
receiving, with one or more processors, handwritten information from an input document, the input document including a union of all fields from output documents;
receiving, with the one or more processors, a machine-readable code from the input document identifying the input document, at least one field on the input document, a location for each of the at least one fields on the input document and the output documents for automatic completion, wherein at least two of the output documents are different;
determining, with the one or more processors, an identity of the input document, the at least one field on the input document, the location for each of the at least one fields and the output documents for automatic completion, wherein at least two of the output documents are different, from the machine-readable code;
extracting, with the one or more processors, markings including the handwritten information corresponding to the at least one field identified at the location from the input document for replicating on the output documents;
composing, with the one or more processors, the output documents with the extracted markings including the handwritten information scaled horizontally and vertically by a fixed length to maintain an aspect ratio corresponding to the at least one field on the input document, copied and repositioned to fit at least one corresponding field in the output documents in addition to highlighting at least one incomplete field with a color and redacting at least one completed field in the output documents;
outputting, with the one or more processors, the output documents; and
mapping, with the one or more processors, fields between the input and the output documents.

12. The method of claim 11, further comprising:
identifying a field on the input document;
identifying a corresponding field on the output documents; and
establishing a relationship between the field on the input document and the corresponding field on the output documents.

13. The method of claim 12, wherein identifying includes creating a list of unique fields, where each field includes a unique field identifier, a list of documents the field appears on, an offset of the field from a reference point and a width and a height of the field on that document.

14. The method of claim 11, wherein the output documents include their own machine-readable codes.

15. The method of claim 11, further comprising scanning and storing an original form for automatic completion.

16. The method of claim 11, further comprising determining a set of output forms.

17. The method of claim 11, wherein outputting the output documents comprises printing the output documents.

18. The method of claim 11, wherein the step of receiving includes receiving input documents, at least two of the input documents having a different field.

19. The system of claim 1, wherein the input document is a master form for a set of forms that includes all unique fields from the set of forms and wherein a user completes a single form that the automatic completion device uses to generate multiple output documents.

20. The system of claim 1, wherein the automatic completion device computes a bounding box of the extracted markings including the handwritten information, rescales and repositions the extracted markings to fit a size of the at least one corresponding field.

21. The system of claim 19, wherein the master form includes fields in a first language and the user's native language and wherein the automatic completion device generates the output documents in the first language and not the native language.

* * * * *